F. G. BEETEM.
ELECTRICAL SYSTEM OF DISTRIBUTION.
APPLICATION FILED JUNE 9, 1914.
1,147,692.
Patented July 20, 1915.
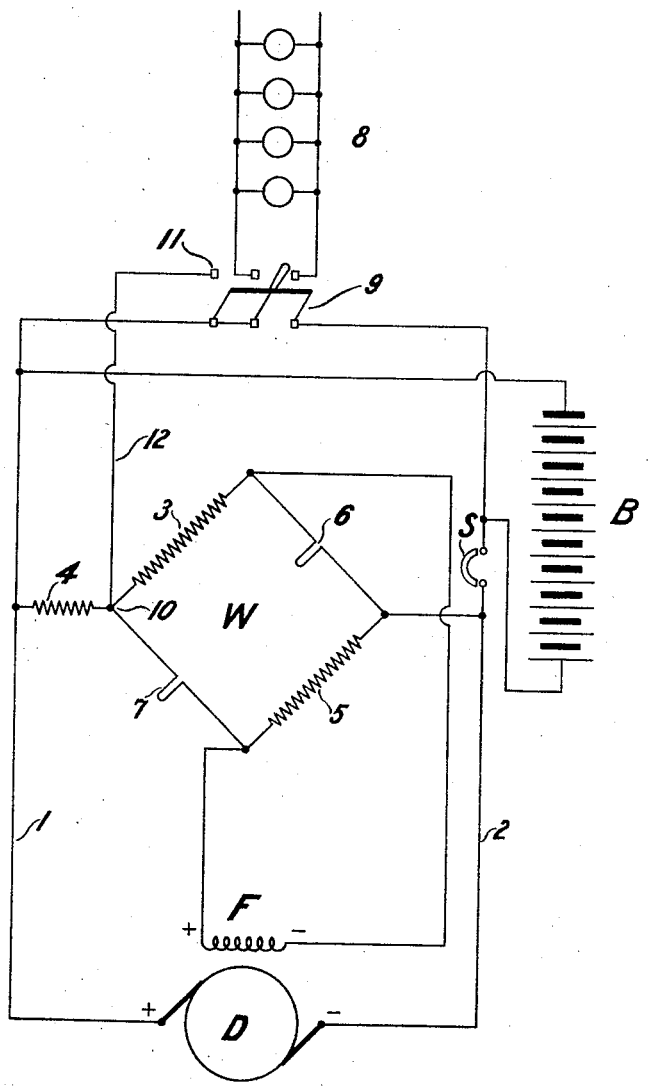
WITNESSES:
INVENTOR
Frank G. Beetem,
BY
Augustus B. Stoughton,
ATTORNEY.

UNITED STATES PATENT OFFICE.

FRANK G. BEETEM, OF PHILADELPHIA, PENNSYLVANIA.

ELECTRICAL SYSTEM OF DISTRIBUTION.

1,147,692.     Specification of Letters Patent.     Patented July 20, 1915.

Application filed June 9, 1914. Serial No. 844,025.

*To all whom it may concern:*

Be it known that I, FRANK G. BEETEM, a citizen of the United States, and a resident of Philadelphia, in the county of Philadelphia and State of Pennsylvania, have invented certain new and useful Improvements in Electrical Systems of Distribution, of which the following is a specification.

My invention relates to systems in which a variable speed dynamo supplies current to a consumption circuit requiring substantially constant voltage, and in which a storage battery is employed for supplying current to the circuit when the dynamo is shut down.

My invention relates particularly to systems in which a combination of special resistances is arranged in the form of a Wheatstone bridge for controlling the field excitation of the dynamo to produce constant voltage with variable speed. In such systems it is customary to adjust the dynamo voltage at a value slightly above the floating voltage of the battery but not sufficiently high to give the battery a high voltage gassing charge.

The object of my invention is to provide means in such a system for giving the battery a high voltage gassing charge at a time when the consumption circuit is disconnected and automatically reduce the voltage to normal whenever the consumption circuit is connected to the dynamo and battery.

The accompanying drawing is a diagrammatic illustration of one embodiment of my invention.

In the drawing D is the dynamo and F its field winding. The dynamo is connected to the circuit 1—2 across which a storage battery B is also connected. An automatic switch S is shown designed to connect the dynamo to the circuit when its voltage is suitable and to disconnect the dynamo when its voltage is below normal. This switch may be of any of the well known types. Across the conductors 1—2 is connected a Wheatstone bridge W comprising resistances 3 and 5 of constant temperature coefficient arranged in opposite branches of the bridge and resistances 6 and 7 having a high positive temperature coefficient, such as the well known iron wire "ballasts," arranged in the other two opposite branches of the bridge. A resistance 4 is also shown, connected between conductor 1 and the corresponding junction point 10 of the bridge.

The field F is connected across the two opposite points of the Wheatstone bridge as shown. The consumption circuit is shown at 8 which may be connected to the conductors 1 and 2 by means of the switch 9. A conductor 12 connects the junction point 10 of the bridge to a terminal clip 11 of the switch 9, this clip 11 being connected to conductor 1 by a third blade of the switch 9 whenever the switch is closed. When the switch 9 is closed, therefore, the resistance 4 is short circuited by the third blade of the switch. The design of the apparatus is such that when the resistance 4 is thus short circuited by closing the switch 9 the voltage of the dynamo is maintained at the normal value slightly above the floating voltage of the battery for all dynamo speeds above a certain critical speed. This result is accomplished by reason of the special characteristics of the resistances composing the bridge. The iron wire ballasts 6 and 7 exhibit a constant current characteristic for wide variations of impressed voltage within certain limits and the resistances 3 and 5 are so designed that when they are carrying a current equal to the constant current maintained by the resistances 6 and 7 the voltage drop across 3 or 5, respectively, will be one-half the desired limiting voltage across conductors 1—2. Should the voltage across conductors 1 and 2 reach this desired limit, the potential across the field F would be reduced to zero. For all values of voltage across the circuit 1—2 below this limit there will be a flow of current in the field F tending to increase with a slight reduction of voltage across the conductors 1—2, thus maintaining the voltage of the dynamo D substantially constant.

When the switch 9 is opened the short circuit around resistance 4 is opened and there will be a certain voltage drop in resistance 4, lowering the voltage impressed by the dynamo across the Wheatstone bridge. This will lower the potential at the negative terminal of the field F, and thus raise the voltage of the dynamo. In order to restore the balance in the bridge to the normal point, the voltage of the dynamo D must rise until the voltage across the Wheatstone bridge is brought back to very nearly the original value. Thus when the switch 9 is opened the voltage of the dynamo D will be raised to a point sufficient to give the battery a high voltage gassing charge, but as soon as the consumption circuit 8 is connected by closing the switch 9 the voltage of the dynamo will be automatically reduced to the normal value, thus preventing the consumption circuit from being subjected to an excessive voltage.

Having described my invention what I claim and desire to secure by Letters Patent is—

1. In a system of electrical distribution including a dynamo and its field winding, the combination of a Wheatstone bridge connected at two opposite junction points to the dynamo terminals and at the other two opposite junction points to the field winding, said bridge being composed of resistances having markedly different temperature coefficients whereby the dynamo voltage is maintained substantially constant, with means for adjusting said voltage comprising a resistance connected between one terminal of the dynamo and the corresponding junction point of the bridge and means for controlling said resistance.

2. In combination, a dynamo provided with a field winding, a storage battery, means for connecting them in parallel relation, a consumption circuit, a switch for connecting said consumption circuit to the battery and dynamo, a Wheatstone bridge connected at two opposite junction points to the dynamo and at the other two opposite junction points to the field winding, said bridge composed of resistances having markedly different temperature coefficients whereby the current in the field winding is controlled to maintain substantially constant dynamo voltage, a resistance connected between one of the dynamo terminals and the corresponding junction point of the bridge and means controlled by the consumption circuit switch for short-circuiting said resistance when said switch is closed and opening the short circuit when the switch is open.

In testimony whereof I hereunto signed my name.

FRANK G. BEETEM.

Witnesses:
J. LESTER WOODBRIDGE,
J. H. TRACY.